June 6, 1950     G. E. BJÖRKLUND     2,510,493

METHOD OF PRODUCING GRINDING BODIES

Filed May 22, 1946

INVENTOR
Gustaf Erik Björklund
BY
his ATTORNEY

Patented June 6, 1950

2,510,493

UNITED STATES PATENT OFFICE 2,510,493

METHOD OF PRODUCING GRINDING BODIES

Gustaf Erik Björklund, Stockholm, Sweden

Application May 22, 1946, Serial No. 671,631
In Sweden February 1, 1943

Section 1, Public Law 690, August 8, 1946
Patent expires February 1, 1963

5 Claims. (Cl. 18—47.5)

The present invention relates to a new and improved method of making grinding bodies substantially consisting of hard grains embedded in a comparatively soft binding material. Such grinding bodies are now often manufactured in the following manner. They are first formed from a mass containing the grinding grains and the soft material with or without pressure and are thereafter subjected to a heating process by which the mass is sintered or melted together. It is important that the grinding bodies have the desired shape after the heating process as further forming is thereafter practically impossible. It has therefore been proposed to lay the mass in a previously prepared mould in which it is allowed to remain during the heating process. This method is however possible only with certain shapes of the bodies.

According to the present invention the original shape of the grinding body can be carefully preserved in any arbitrary shape of the body by surrounding the body with a heat resisting mass which is applied to the grinding body in plastic state.

The invention will be described in the following specification with reference to the annexed drawing which shows a grinding body covered with a heat resisting mass according to the invention.

Figure 1:
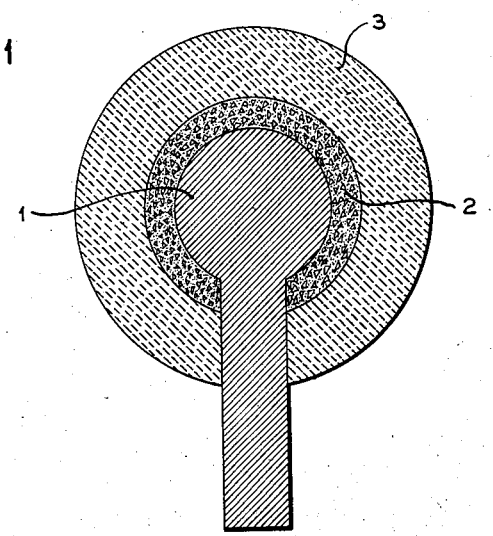
Figure 2:
Figure 3:
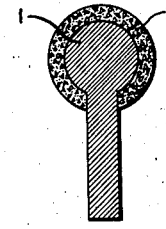
Figure 4:
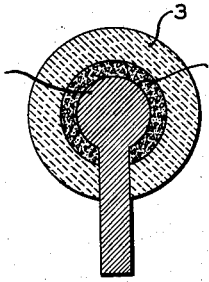
Figure 5:
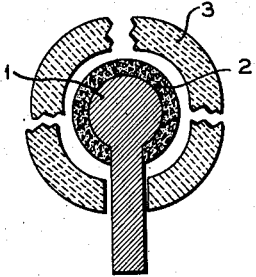

Fig. 1 is a transverse sectional view illustrating a grinding body and heat resistant shell positioned upon a suitable core;

Fig. 2, a transverse sectional view through the core of Fig. 1, illustrated on a somewhat smaller scale;

Fig. 3, a transverse sectional view through the core illustrating a grinding body positioned thereon;

Fig. 4, a transverse sectional view, similar to Fig. 1, illustrating core, grinding body and heat resistant shell; and Fig. 5, a transverse sectional view, similar to Fig. 4, but illustrating the heat resistant shell broken away, exposing the periphery of the grinding body.

In the figure 1 marks a core of metal that is not fusible at the temperature of the heating process and of a shape similar to the finished grinding body. On this core a layer of a plastic mass 2 is built up, said mass consisting of the grinding grains, the binding material, preferably in granular form and a plasticizing agent. In order to facilitate the fixing of the grinding grains in the binding material during the heating process that follows, these have been covered with a metal covering before their mixing in the mass. A suitable flux is also put in the mass. By way of an example the mass may consist of diamond grains, nickel powder, granulated borax and paraffin as plasticizing agent. The layer of said mass having been built up, the body is after-formed to its definitive shape by turning.

On the outside of the mass containing the grinding grains the grinding body is thereafter covered with a shell 3 of a heat resisting refractory material, for instance fire-clay. This material is also applied in plastic state. In order to prevent the layer containing the grinding grains from getting damaged by this operation, said layer may be impregnated with a material which is insoluble or only little soluble in the plasticizing agent of the heat resisting mass. In case fire-clay is used and the plasticizing agent of the layer containing the grinding grains is soluble in water the layer may be impregnated with wax or shellac or celluloid solution by way of example. Equivalent with the impregnating material defined above is of course a material that in itself is soluble in the plasticizing agent but can be made insoluble or little soluble by certain treatment for instance drying or heating.

After the deposition of the heat resisting mass this is thoroughly dried. In order to prevent deformation during the drying operation it is suitable that the heat resistant mass is applied in several layers, each layer is dried before the next being applied.

After the heat resisting shell has been completely dried the entire grinding body is exposed to such a temperature that the granular binding material will be fused and solder the different grinding grains together. After the heating thus a layer of relatively soft binding material with embedded grinding grains is obtained which is firmly fixed to the core. The heat resistant shell having been removed the grinding body is sandblasted or otherwise dressed so that the outermost located grains will be uncovered.

The way in which the grinding body is shaped and the components of which it is built is however immaterial, and the described method is only to be regarded as an example. It also does not matter if the grinding body is formed with or without a core.

What I claim is:

1. The method of producing grinding bodies consisting of hard grains embedded in a comparatively soft binding material which includes the steps of forming a grinding body of cohesive powdered material including said grains to desired external shape by a suitable forming operation, forming a shell of heat resistant refractory material while in the plastic state about the formed grinding body to provide an enclosing mold conforming to the shape of the previously formed body, heating the body and the mold to sinter or fuse together the components of said body and thereafter removing said refractory mold from said body.

2. The method of producing grinding bodies consisting of hard grains embedded in a comparatively soft binding material which includes the steps of forming a grinding body of cohesive powdered material including said grains to desired external shape by a suitable forming operation, forming a shell or mold about said body conforming to the external shape thereof by applying in plastic state and then drying successive layers of heat resistant refractory material, heating the body and mold to sinter or fuse the components of said body together and thereafter removing said refractory mold from said body.

3. The method of producing grinding bodies consisting of hard grains embedded in a comparatively soft binding material which includes the steps of forming a grinding body of cohesive powdered material having a metallic base and including said grains to desired external shape by a suitable forming operation, forming a shell of heat resistant refractory material while in the plastic state about the formed grinding body to provide an enclosing mold conforming to the shape of the previously formed body, heating the body and the mold to sinter or fuse together the components of said body and thereafter removing said refractory mold from said body.

4. The method of producing grinding bodies consisting of hard grains embedded in a comparatively soft binding material which includes the steps of forming a grinding body of cohesive powdered material having a metallic base and including said grains to desired external shape by a suitable forming operation, forming a shell of heat resistant refractory material of the nature of fire clay while in the plastic state about the formed grinding body to provide an enclosing mold conforming to the shape of the previously formed body, heating the body and the mold to sinter or fuse together the components of said body and thereafter removing said refractory mold from said body.

5. The method of producing grinding bodies consisting of hard grains embedded in a comparative soft binding material which includes the steps of forming a grinding body of cohesive powdered material having a metallic base and including said grains to desired external shape by placing a layer of said material about a core of metal having a higher fusion point than the fusion point of the metallic base of said material, forming a shell of heat resistant refractory material of the nature of fire clay while in the plastic state about the formed grinding body to provide a mold conforming to the shape of the previously formed body, applying heat to the assembly at a temperature sufficiently high to sinter or fuse components of said body together but below the temperature of fusion of said core and thereafter removing the refractory material from said body.

GUSTAF ERIK BJÖRKLUND.

REFERENCES CITED

The following references are of record in the file of this patent:

UNITED STATES PATENTS

| Number | Name | Date |
|---|---|---|
| 529,611 | Dittmer | Nov. 20, 1894 |
| 1,013,657 | Higgins | Jan. 2, 1912 |
| 1,210,358 | Pfanstiehl | Dec. 26, 1916 |
| 1,653,918 | Martin | Dec. 27, 1927 |
| 2,074,038 | Willey | Mar. 16, 1937 |